(12) United States Patent
Bird (10) Patent No.: US 11,452,261 B2
(45) Date of Patent: Sep. 27, 2022

(54) METHOD FOR STABILIZING A GRAIN MOUND COVERING TARP

(71) Applicant: Spencer Bird, Saline, KS (US)

(72) Inventor: Spencer Bird, Saline, KS (US)

( * ) Notice: Subject to any disclaimer, the term of this patent is extended or adjusted under 35 U.S.C. 154(b) by 274 days.

(21) Appl. No.: 16/834,105

(22) Filed: Mar. 30, 2020

(65) Prior Publication Data
US 2020/0221641 A1    Jul. 16, 2020

(51) Int. Cl.
| | |
|---|---|
| *A01F 25/13* | (2006.01) |
| *A01D 75/00* | (2006.01) |
| *F16L 31/02* | (2006.01) |
| *F16L 11/12* | (2006.01) |
| *F16M 13/02* | (2006.01) |
| *F16L 41/03* | (2006.01) |
| *F16L 37/18* | (2006.01) |

(52) U.S. Cl.
CPC .............. *A01D 75/00* (2013.01); *A01F 25/13* (2013.01); *F16L 11/12* (2013.01); *F16L 31/02* (2013.01); *F16L 37/18* (2013.01); *F16L 41/03* (2013.01); *F16M 13/02* (2013.01)

(58) Field of Classification Search
CPC .............. A01F 25/13; E04H 2015/206; E04H 2015/201; F16L 11/12; F16L 37/18; F16L 41/03
See application file for complete search history.

(56) References Cited

U.S. PATENT DOCUMENTS

| | | | | | |
|---|---|---|---|---|---|
| 4,122,637 | A | * | 10/1978 | Runge | A01F 25/13 52/745.08 |
| 5,863,079 | A | * | 1/1999 | Donais | F16L 35/00 285/379 |
| 6,363,661 | B1 | * | 4/2002 | Myers | A01F 25/13 52/2.13 |
| 6,966,152 | B2 | * | 11/2005 | Glynos | A01F 25/13 248/910 |
| 10,473,249 | B1 | * | 11/2019 | Hartman | F16L 37/18 |
| 11,131,413 | B2 | * | 9/2021 | Hartman | F16L 37/18 |
| 2004/0194393 | A1 | * | 10/2004 | Horman | E04B 1/66 52/3 |
| 2010/0083587 | A1 | * | 4/2010 | Glynos | A01F 25/13 52/3 |
| 2016/0076688 | A1 | * | 3/2016 | Chan | F16L 25/14 285/133.11 |
| 2019/0128011 | A1 | * | 5/2019 | Derbes | E04H 15/20 |
| 2021/0206620 | A1 | * | 7/2021 | Edwards | B67D 3/043 |

* cited by examiner

*Primary Examiner* — Bradley Duckworth
(74) *Attorney, Agent, or Firm* — Kenneth H. Jack; Davis & Jack, L.L.C.

(57) ABSTRACT

A method for stabilizing a grain mound covering tarp including steps of assembling a matrix of flexible tubes over the tarp and filling the matrix of flexible tubes with water; wherein the matrix assembling step provides a multiplicity of collapsible tubes forming a quadrilateral grid; wherein the matrix assembling step further provides a plurality of T joints and a plurality of + joints interconnecting the collapsible tubes; wherein the collapsible tube providing steps include a pair of cam connector halves attached to the ends of each collapsible tube; wherein the T joint providing steps include a triple of cam connector halves attached to each T joint; and wherein the + joint providing steps include a quadruple of cam connector halves attached to each + joint.

10 Claims, 11 Drawing Sheets

METHOD FOR STABILIZING A GRAIN MOUND COVERING TARP

FIELD OF THE INVENTION

This invention relates to methods, processes, and practices for mounded ground storage of harvested crops. More particularly, this invention relates to such methods and processes which cover a grain mound with a protective tarp.

BACKGROUND OF THE INVENTION

Cereal grains such as wheat are often stored upon the ground in the form of a grain mound. Such practice is prominently used where nearby grain silo storage for a harvested grain crop is unavailable. In order to effectively contain a grain mound and to prevent horizontal spreading of the mound over the ground, a peripheral wall or bunker is often erected around the edges of the mound; the grain mound being poured and filled within the interior space defined by the bunker.

In order to ventilate and assist in drying of such mounded grain, air flow tubes are often arrayed upon the ground within the interior of the bunker, such tubes extending outwardly toward and communicating with exhaust fans which are mounted upon the bunker. Operation of the exhaust fans draws air into the tubes, and ejects the air at the exterior of the bunker. Upon filling of the bunker area with a grain mound, such air flow tubes are covered with grain, and upon such grain filling operation of the exhaust fans draws air through the spaces between grain particles and ejects the air outside the bunker. To prevent rain from soaking and spoiling the mounded grain, a moisture impervious tarp is commonly laid over the grain mound, and such operation of the exhaust fans additionally creates a relatively low pressure zone beneath the cover tarp.

Negative air pressure provided by continuous operation of the exhaust fans is often sufficient to hold the tarp in place. However, on occasion, such exhaust fans are unable to securely hold a grain tarp in place, particularly during high winds. Upon interruption of power to the exhaust fans, moderate winds may undesirably lift the tarp from the grain mound. Such wind induced lifting of a grain mound covering tarp may undesirably lead to oscillation and waving of the tarp, and may ultimately allow the wind to tear and open the tarp. Where a grain mound tarp becomes torn, the grain stored beneath the tarp may be soaked by rain and thereby be spoiled.

The instant inventive method provides a tarp hold down which effectively protects against such wind induced tarp tearing and grain spoilage.

BRIEF SUMMARY OF THE INVENTION

The instant inventive method is preferably performed upon grain mounds which are covered by a protective tarp. Other harvested agricultural products such as peas or beans which may also be stored in mounds upon the ground while covered by a tarp are considered to constitute grains falling within the scope of the invention. References to grain and grain mounds below are intended to generally refer to ground storage of cereal grains, harvested legumes, and other types of ground mounded harvested crops.

A first step in the performance of the instant inventive method may constitute an assembly upon a grain mound covering tarp of a matrix of flexible hollow tubes. In a preferred mode of performance, agricultural workers may manually assemble the matrix of tubes while walking about on top of the grain tarp, and while carrying the various components of the tube matrix. Tube interconnecting joints having cam connectors at their terminals are preferably provided for interconnecting the ends of the multiple tube segments of the matrix. Upon complete assembly of the tube matrix, a substantial portion of the grain mound covering tarp is preferably covered by the matrix.

Following the assembly of the tube matrix, the hollow interior of the matrix's tubes is filled with water. Thereafter, all inlet and outlet openings of the matrix are preferably closed. Thereafter, the combined weight of the matrix of tubes, including the matrix's connectors and the water contained within the matrix, holds the tarp downwardly against the grain mound, effectively stabilizing the tarp against the potentially destructive effects of wind.

In a preferred mode of performance of the instant inventive method, the tube segments of the matrix are collapsible so that the segments in their flattened configurations may be spirally wound and easily carried. Expansion of the initially flat tube segments upon water filling advantageously serves as a visual indicator of complete filling of the matrix.

Where the grain mound is horizontally oblongated, substantially all of the tube segments of the matrix may be of equal length, and multiplicities of tee or "T" joints and cross or "+" joints are provided to interconnect the segments into a quadrilateral matrix having substantially square sections. Alternatively, where the matrix extends circumferentially about a conical grain mound formed at a central filling point, a quadrilateral matrix having differing lengths of tube segments defining trapezoidal matrix sections may be formed.

Accordingly, objects of the instant inventive method include the establishment of method and process steps as described above for the achievement of beneficial grain tarp holding functions described above.

Other and further objects, benefits, and advantages of the instant method will become known to those skilled in the art upon review of the Detailed Description which follows, and upon review of the appended drawings.

DETAILED DESCRIPTION OF A PREFERRED MODE OF PERFORMANCE OF METHOD

Figure 1:
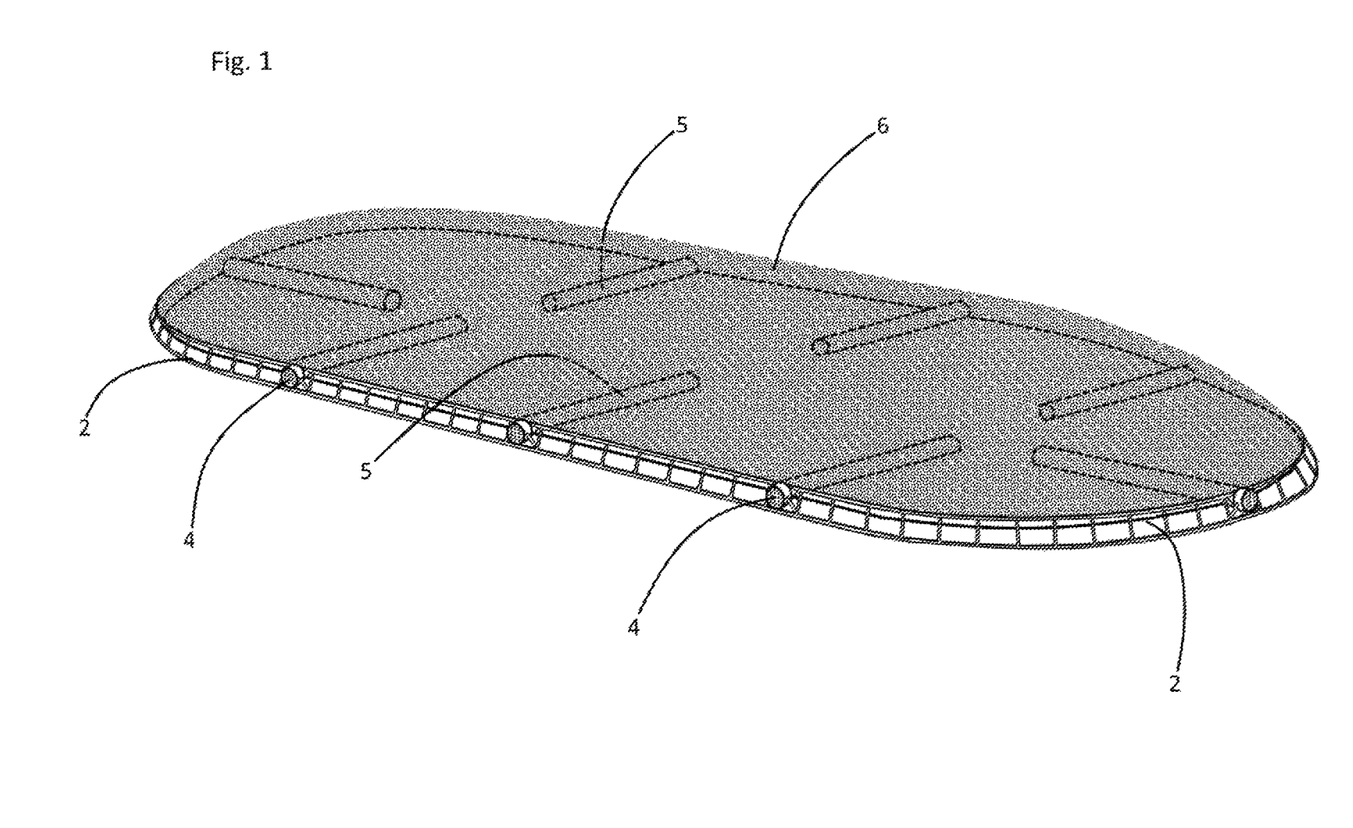
FIG. 1 is a perspective view of a grain mound retained on the ground by a peripheral bunker.

Referring now to the drawings, and in particular to Drawing FIG. 1, a horizontally oblongated grain mound 6 upon which the inventive method may be performed is depicted. The mound 6 includes grains, which for purposes of the instant invention are intended to include cereal grains and other harvested crops such as beans which may be stored in mounds upon the ground.

Figure 2:
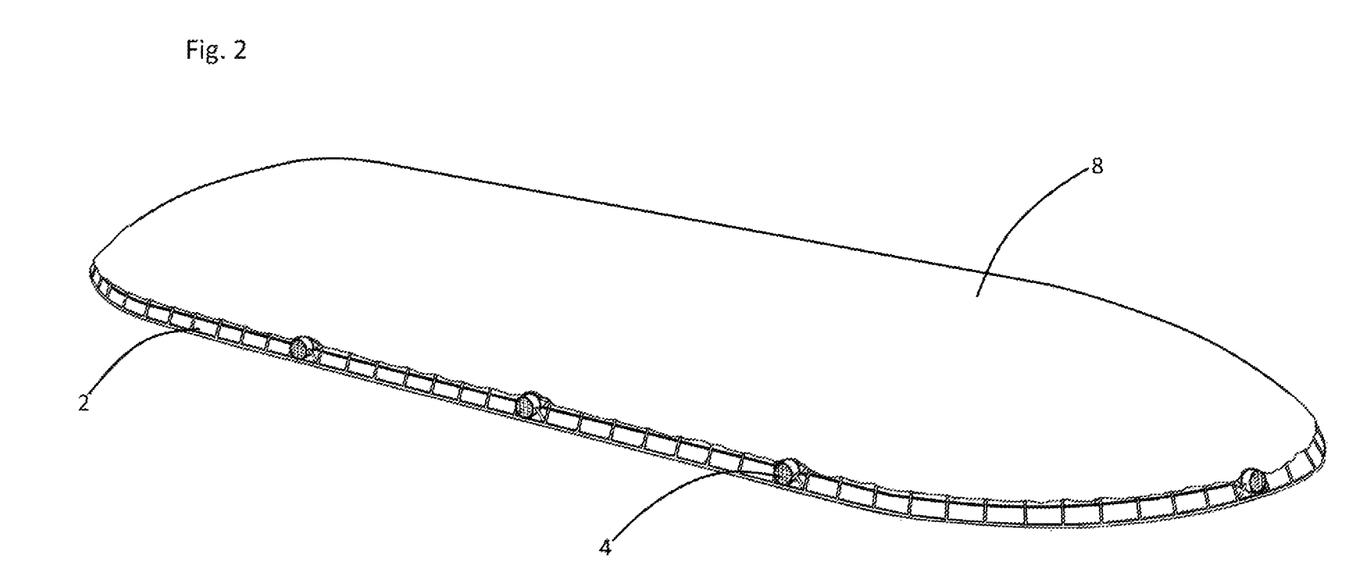
FIG. 2 redepicts the structure of FIG. 1, the view of FIG. 2 further showing a grain covering tarp covering the grain mound.

The mound 6 is progressively filled and formed upon the ground, and the edges of such mound are commonly retained by a wall or bunker 2 which completely borders the mound's peripheral edge. Perforate exhaust tubes 5 are preliminarily placed upon the ground at the interior of the bunker 2, such tubes 5 extending to and communicating with exhaust fans 4 which are mounted upon and supported within wall openings within the bunker 2. In operation, the fans 4 move air outwardly from the interior of the bunker, drawing air inwardly through the mounded grain 6. Such fan driven air flow advantageously aerates and dries the grain 6. Referring simultaneously to FIGS. 1 and 2, a moisture impervious tarp 8 is provided, such tarp suitably comprising a woven polyethylene sheet which is coated with a water sealing plastic membrane. Such tarp is extended over the upper surface of the grain 6 in order to protect the grain from rain. In addition to their aerating function, operation of fans 4 and exhaust tubes effectively creates a negative pressure zone within the grain 6 which downwardly holds the tarp 8 against the upper surfaces of the grain mound 6. During periods of high wind, or at any time fans 4 cease operating, Bernoulli forces imposed by horizontally traveling winds tend to lift the tarp 8 away from the upper surface of the mound 6. Upon raising away from the grain 6, the tarp 8 often begins to oscillate, allowing the wind to tear the tarp, undesirably resulting in rain spoilage of the grain 6.

Figure 5:
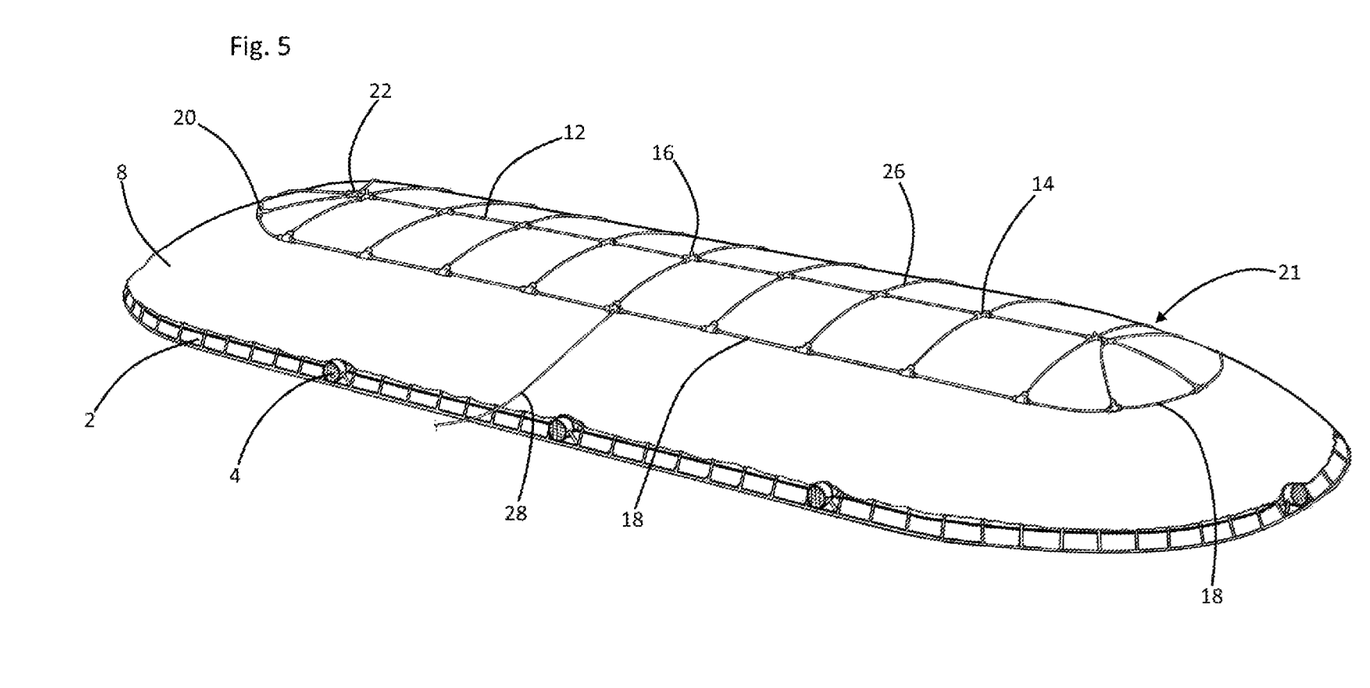
FIG. 5 depicts a next subsequent step of the instant inventive method.
Figure 6:
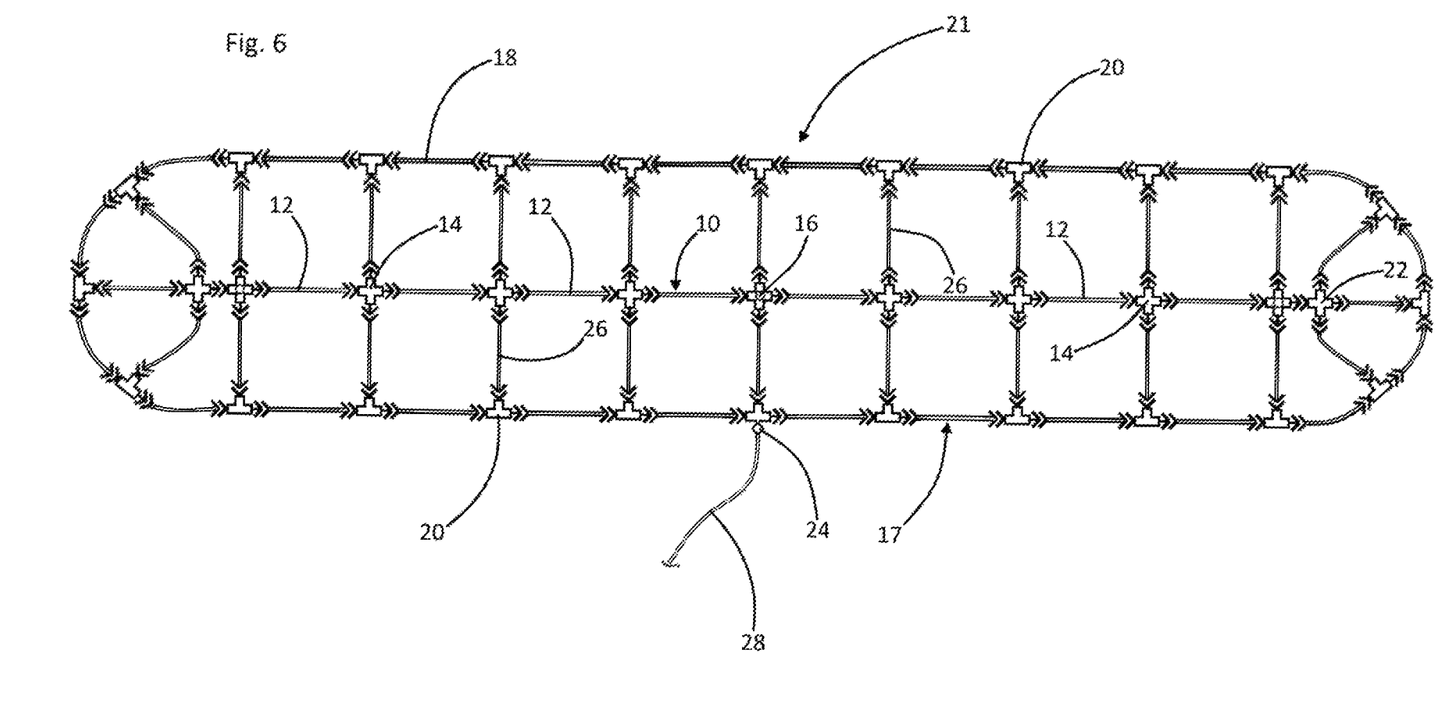
FIG. 6 is a schematic representation of the structure depicted in FIG. 5.
Figure 11:
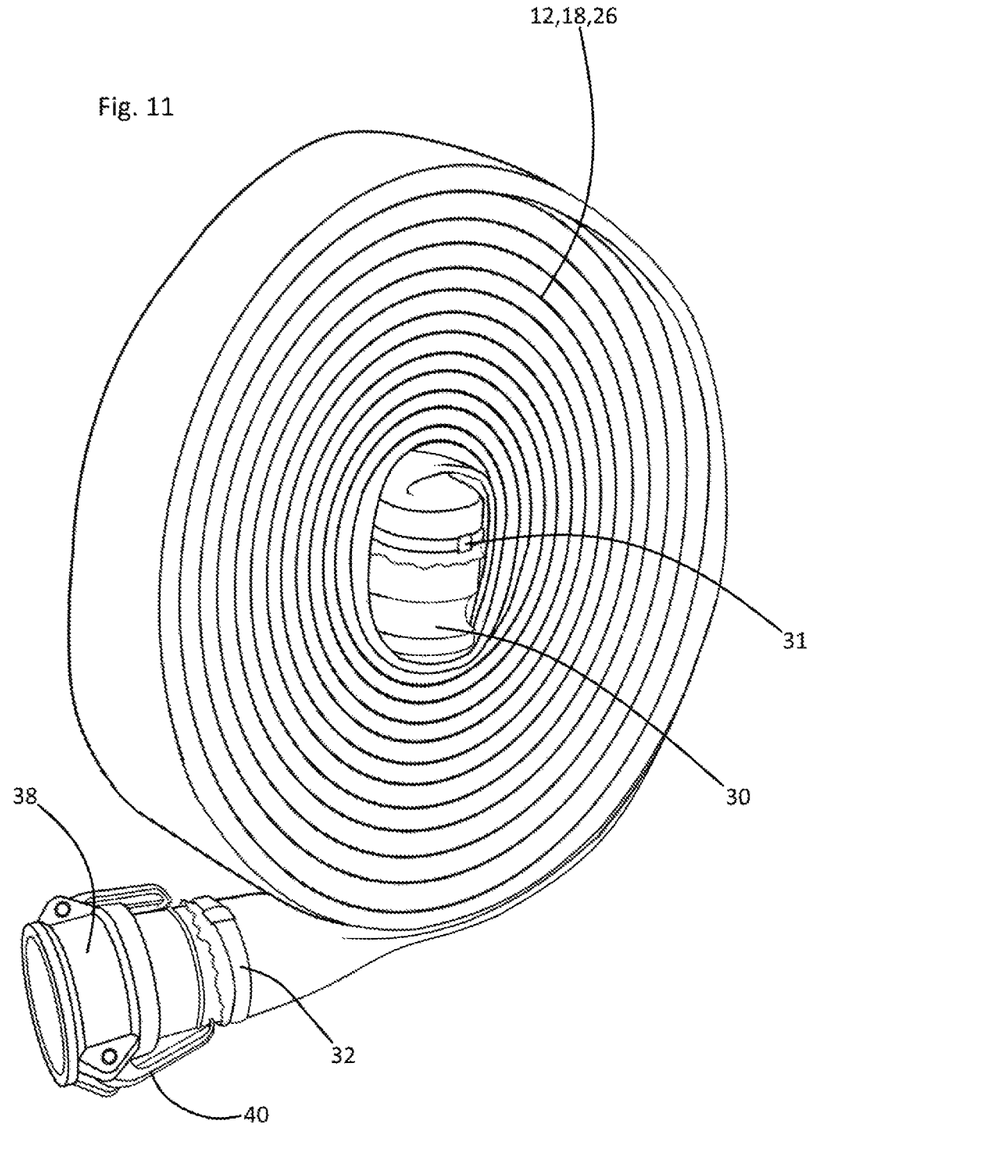
FIG. 11 depicts a spirally wound tube matrix segment, such segment having a pair of cam connectors halves attached to its opposite ends.

Referring simultaneously to FIGS. 2, 5, and 6, a provided matrix including a multiplicity of hollow tube segments is referred to generally by Reference Arrow 21, such matrix being assembled by workers upon the tarp 8. Referring further to FIG. 11, each of the matrix's tube segments (e.g., trunk line tube segments 12, edge tube segments 18, or lateral tube segments 26) preferably constitutes a collapsible supply tube which is initially spirally coiled. Tee or T configured joints 20 and cross of + configured joints 14 are provided as matrix components in order to interconnect the segments 12, 18, 26 in a preferred quadrilateral grid on top of the tarp 8.

Upon filling of the matrix 21 with water via a provided fill tube 28, the combined weight of the matrix 21 and water contained within the matrix effectively holds the grain tarp 8 downwardly against the grain mound 6.

In the preferred mode of performance of the instant inventive method, each tube among the provided multiplicity of tube segments 12, 18, 26 is preferably collapsible so that each may be compactly spirally coiled prior to installation within the matrix 21. The preferred collapsible character of the tube segments additionally advantageously allows for rolling deployments of the spirally rolled tubes during assembly, and allows tube expansions upon water filling to serve as a useful visual indicator of complete filling of the matrix.

Figure 7:
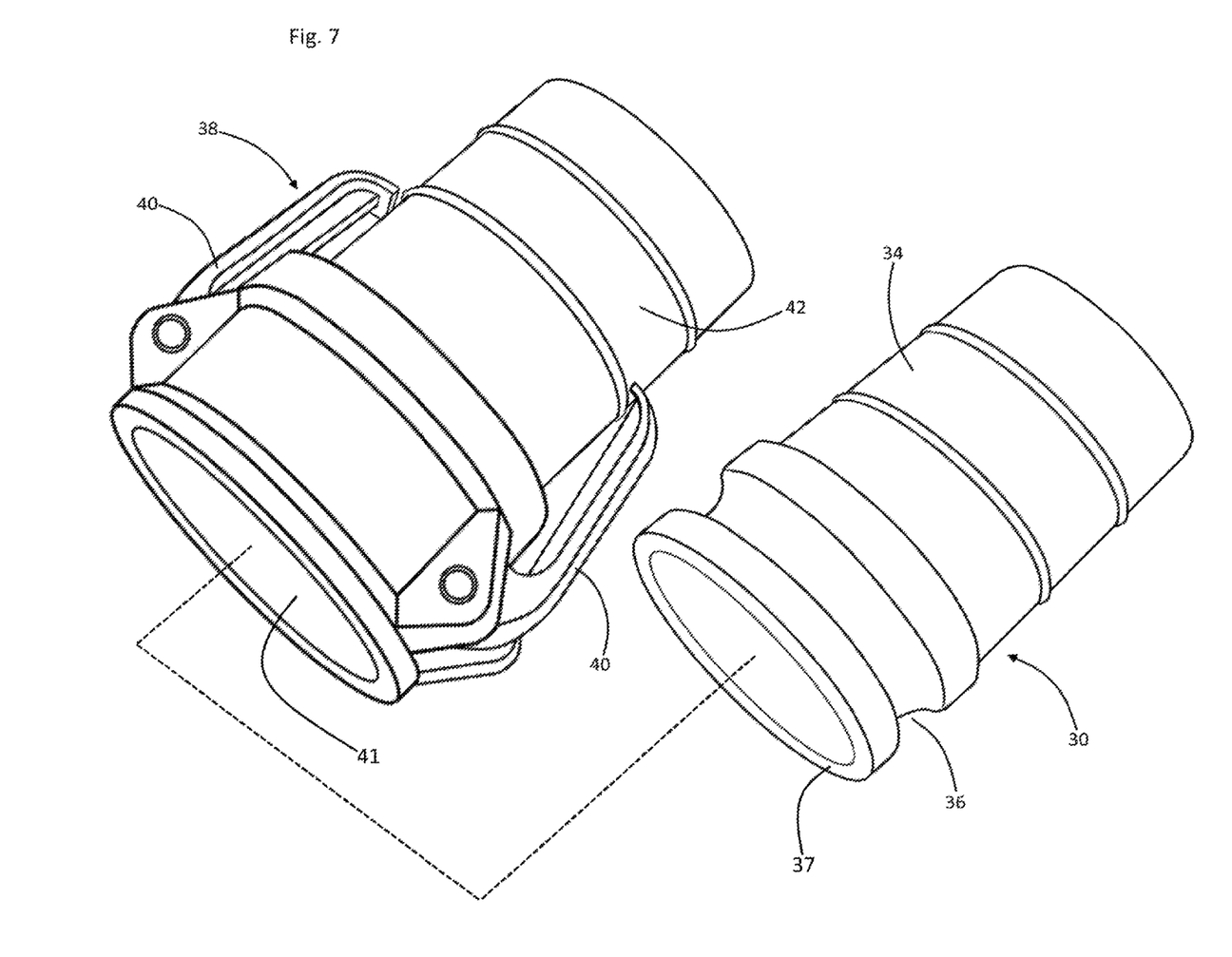
FIG. 7 depicts female and male halves of a cam connector preferably provided in performance of the inventive method.

Referring further to FIG. 7, each tube segment 12, 18, 26 preferably has a pair of cam connector halves fixedly attached to its opposite ends. In the FIG. 11 embodiment, a male cam connector half 30 is attached by a clamp band 31 to the spirally inner end of the tube 12, 18, 26, and a female cam connector half 38 is similarly fixedly attached to the opposite or spirally outer end of such tube by clamp band 32.

In order to assemble the oblongated matrix 21 represented in Drawing FIGS. 5 and 6, workers engaged to perform the instant inventive method may access and carry to the top of the mound a series of eight of the spirally wound tube segments 12. Contemporaneously, referring to FIGS. 9 and 10, the worker may access and carry a series of nine cross or + configured joints 14. In the preferred mode of performance, a plurality of such + configured joints 14 is specially adapted to include a valve controlled air relief port 16, such ports preferably incorporating both a manually turnable stop cock and an internal ball float valve. Each of the provided + joints preferably has an attached quadruple of cam connector halves. In accordance with the depicted embodiment, each + joint 14 may advantageously incorporate a single female cam connector half 38+ and three male cam connector halves 30+. As indicated in FIGS. 7-11, each female cam connector half, connector half 38+, 38T, or 38 as the case may be, which is incorporated into a tube segment or into one of such joints includes a pair of pivoting lever actuated cams 40. Upon insertion of a male cam connector half, connector half 30+, 30T, or 30 as the case may be, into the bore 41 of on one of the female cam connector halves, and upon axially inward pivoting of levers 40, curved cam faces (not depicted within views) exposed at the wall of the bore 41 enter an annular cam receiving channel 36 within the inserted male cam connector half. Upon such cams' entries into the channel, further inward levering of the cams axially drives the inserted male cam connector half, and seats such half's lip 37 against an annular elastomeric seal (not depicted within views) mounted within bore 41.

The exemplary + configured joints 14 are preferably arrayed linearly along the topmost elevation of the tarp 8. Assuming that each of the tube segments 12 is 25 feet, the + configured joints 14 may be spaced therealong at approximate 25 foot intervals. Thereafter, eight of the tube segments 12 which have been carried to the top of the mound 6 may be extended between the + joints 14 in a spirally unrolling fashion. Upon such tube segment extensions, the female cam connector half 38 of each tube segment 12 may be initially attached to one of the + joints 14, preferably attaching at the male cam connector half 30+ which extends oppositely from such one joint's female cam connector half 38+. Thereafter, the male cam connector halves 30 of the tubes 12 may be attached to the female cam connector halves at the opposite ends of the + configured joints 14. Such assembly steps effectively and advantageously establishes a trunk line 10 component of the matrix 21.

Figure 3:
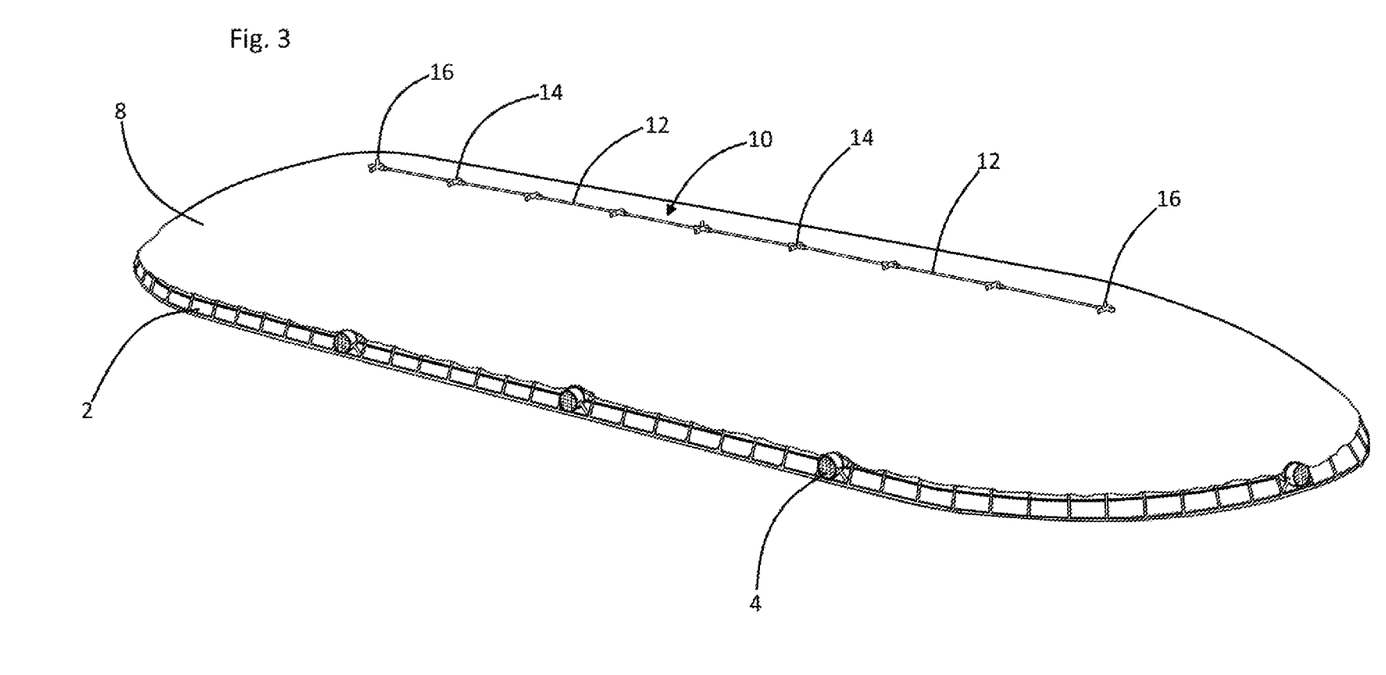
FIG. 3 depicts an exemplary initial step of the instant inventive method.
Figure 4:
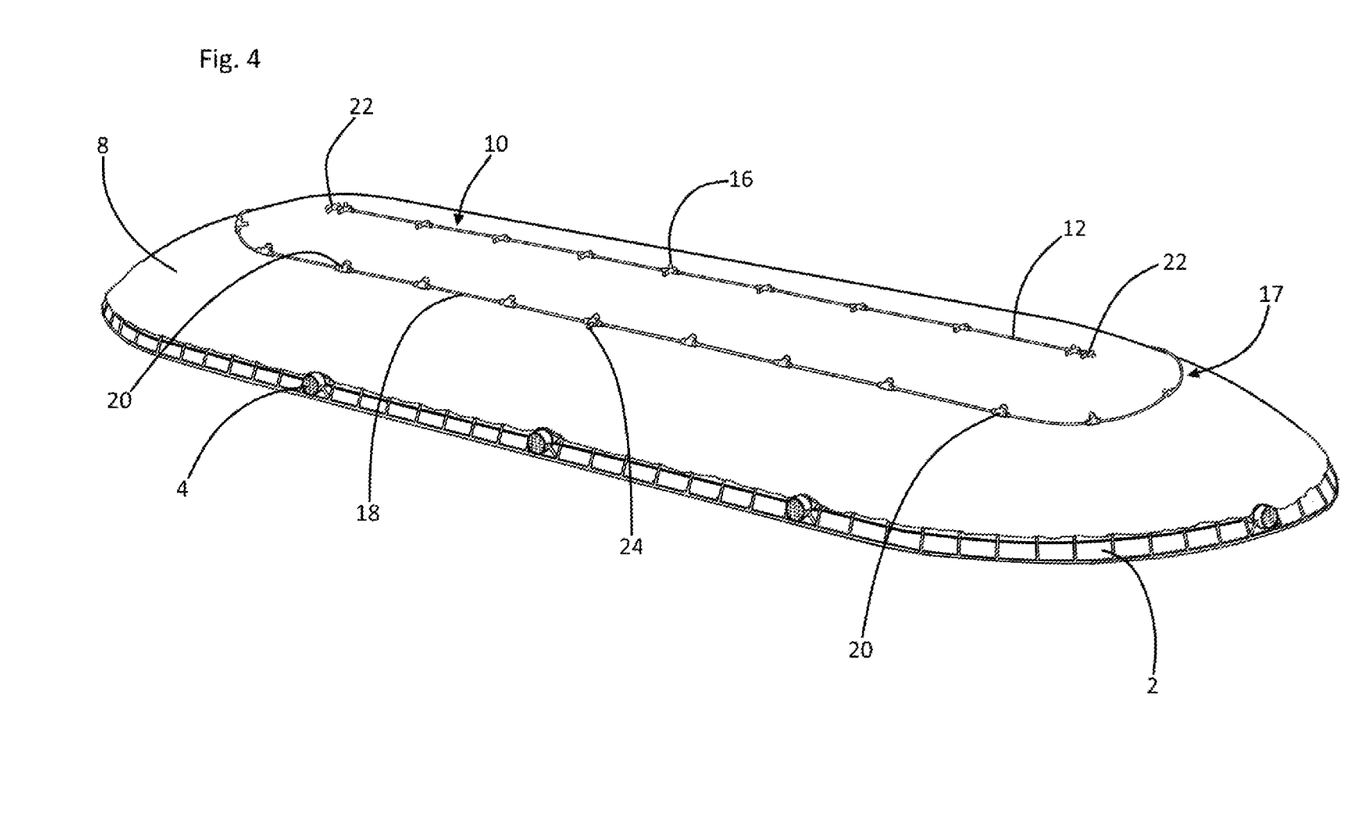
FIG. 4 depicts a subsequent step of the instant inventive method.
Figure 8:
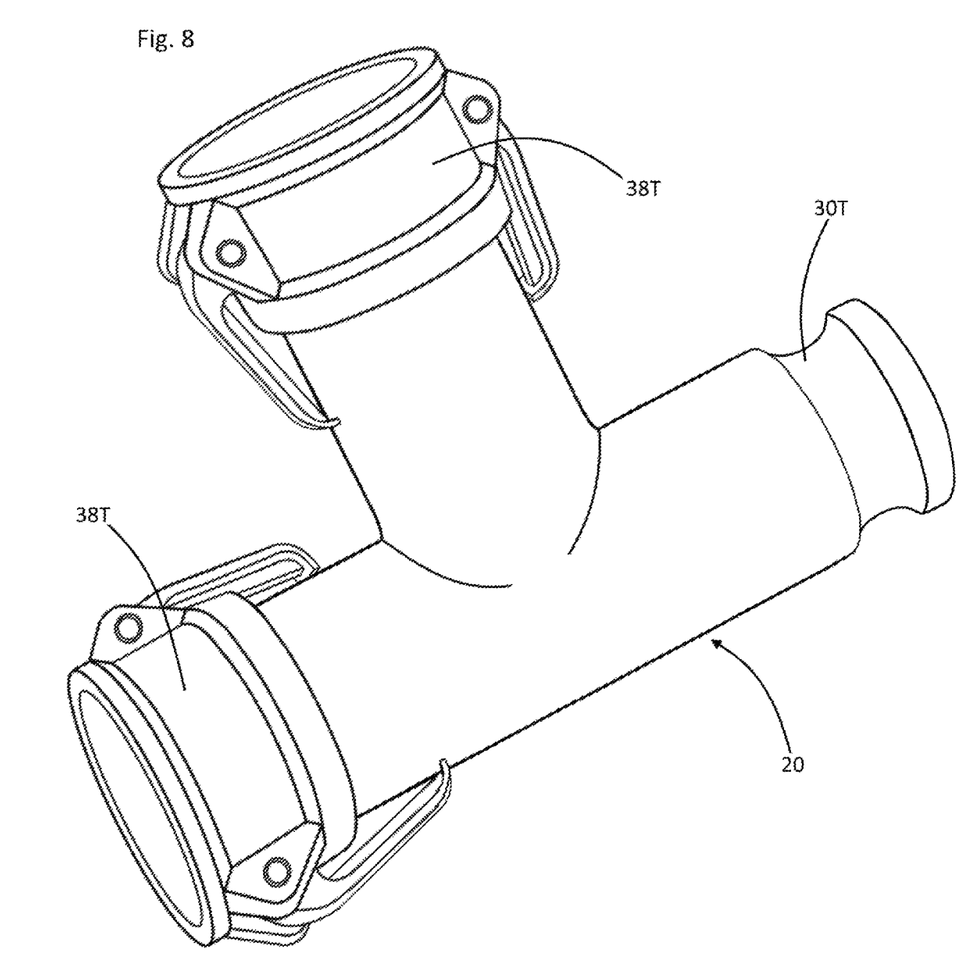
FIG. 8 depicts a T joint having an attached triple of cam connectors halves.

Following assembly of the trunk line 10 depicted in FIG. 3, a peripheral series of tee or T configured joints 20, as shown in FIG. 8, are accessed, each such joint preferably having an attached triple of cam connector halves, in the preferred T joint configuration depicted in FIG. 8, a pair of female cam connector halves 38T is incorporated, one of such halves being presented at the base of the stem of the T joint 20, and the other of such halves being presented at the distal end of one of such joint's arms.

Figure 9:
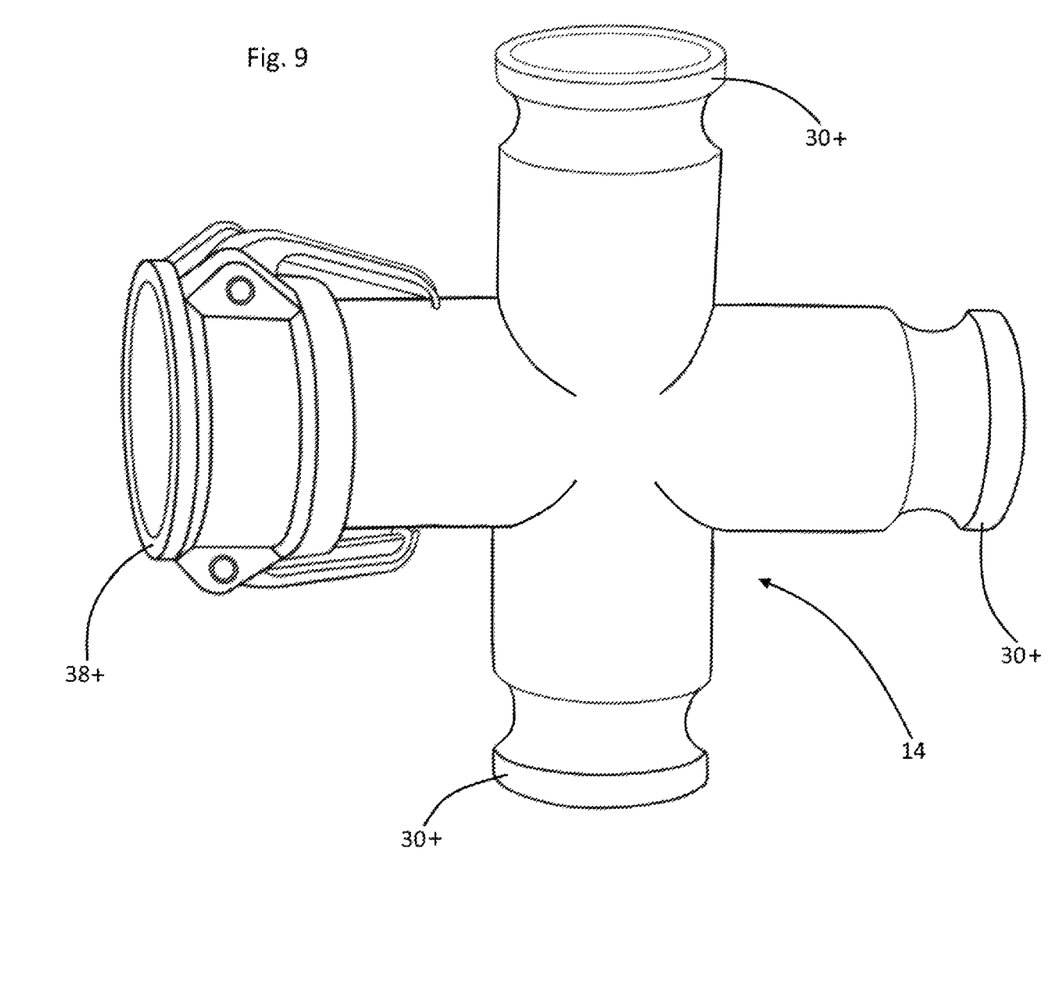
FIG. 9 depicts a + joint having an attached quadruple of cam connectors halves.
Figure 10:
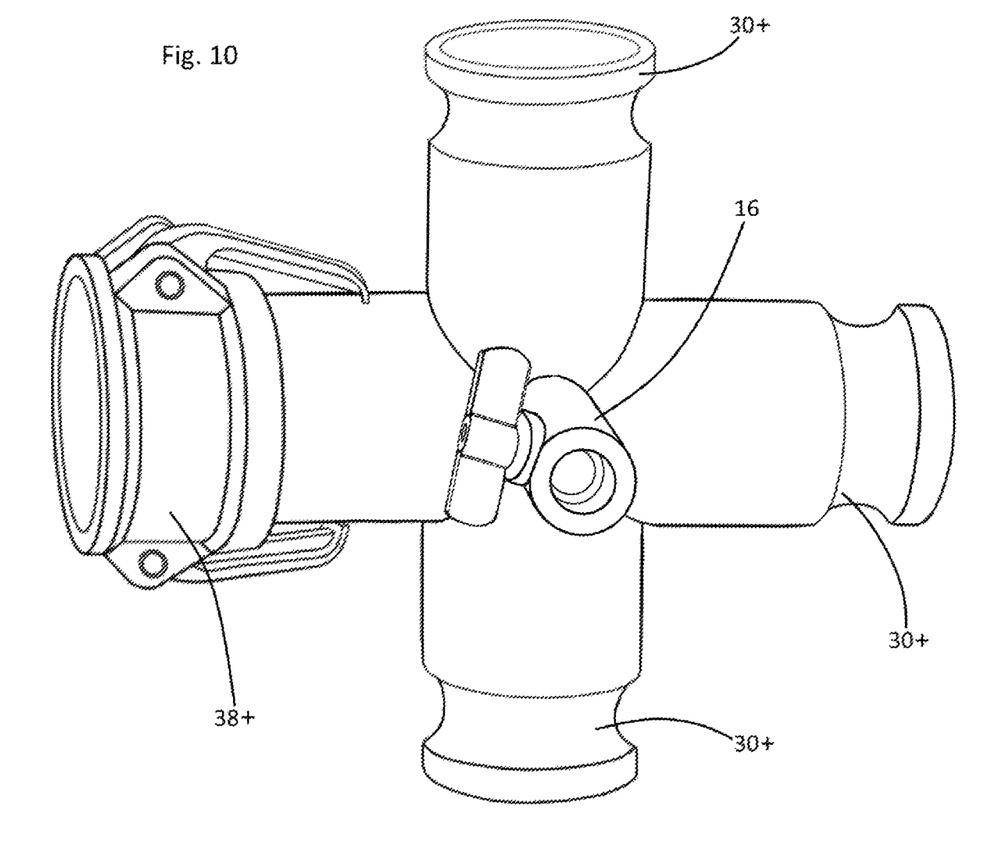
FIG. 10 presents an alternative configuration of the FIG. 9 structure, the + joint of FIG. 10 including a valved air relief port.

The T joints 20 are preferably peripherally arrayed in the pattern indicated in FIG. 6. Thereafter, a second series of spirally wound tube segments 18 is preferably accessed and is utilized to interconnect the T joints 20, such interconnections suitably proceeding in the manner described above in relation to the creation of the trunk line 10. Following complete peripheral assembly of the tube segments 18 and T joints 20, an edge or periphery line 17 encircling the trunk line 10 is advantageously formed as a further component of the matrix 21. Thereafter, lateral tube segments 26 may be incorporated into the matrix 21 in a similar fashion.

Where the + joints' quadruples of cam connector halves incorporate three male cam connector halves 30+, as indicated in FIGS. 9 and 10, each lateral line tube segment 26 must be oriented to extend its female cam connector half 38 upwardly toward the trunk line 10. Such upward orientation allows attachment of the lateral tube segment to one of the trunk line's laterally extending male cam connector halves 30+. Upon such upward attachments of female cam connector halves 38, the spirally wound tube segments 26 may be conveniently unrolled or unwound in a downhill or down slope rolling fashion which is directed toward a female cam connector half 30T presented at the base of the stem of one of the peripherally arrayed T joints 20. At the terminations of such downhill rolling and unwinding deployments of the lateral tube segments 26, those segments' male cam connector halves 30 may harmlessly impinge against the surface of the tarp 8. Accordingly, the incorporation of + joints 14 within the trunk line 10 which are configured as indicated in FIGS. 9 and 10 advantageously avoids potentially piercing impingements of cam levers 40 against the tarp 8 upon such downhill rolling lateral tube section deployments.

Referring to FIGS. 5, 6, and 10, those + joints 14 which are specially adapted to include an air vent 16 are preferably spaced evenly along the trunk line 10, and at least one of the peripheral T joints 20 is preferably specially adapted to include a valve controlled fill port 24. A water fill line 28 is preferably attached to fill port 24 for filling of the matrix 21, such port 24 preferably being controlled by a stop cock.

Where the grain mound 6 is horizontally oblongated as indicated in FIGS. 1, 2, and 6, the tube matrix 21 is preferably assembled in the manner described above. Alternatively, where the grain mound is conical (not depicted in views), resulting from a filling of the mound at a fixed or central fill point, the trunk line 10 component of the matrix may alternatively extend circumferentially about such conical mound. Where a circumferentially extending trunk line is provided, concentric upper and lower edge lines may similarly extend circumferentially about such grain mound, one of such edge lines extending above the circumferential trunk line, and the other lying below the circumferential trunk line. In such alternative matrix configuration, the tube matrix preferably forms a quadrilateral grid which includes trapezoidal sections as opposed to the quadrilateral grid of square sections depicted in FIGS. 5 and 6. Also in such alternative matrix configuration, valved air relief ports are preferably incorporated into T joints of such upper circumferential edge line.

Following assembly of the matrix 21 of FIGS. 5 and 6, water may be pumped through fill line 28, initially filling the matrix's edge line 17. During the water filling, the initially collapsed tube segments 18 visibly change from their substantially flat configurations to expanded cylindrical configurations. Also during the water filling, air trapped within the matrix 21 emits through the upper vent ports 16. As filling progresses, lateral tube segments 26 become filled, and thereafter, the upper tube segments 12 of the trunk line 10 finally become filled with water. Upon complete filling of the matrix 21, floating balls within vents 16 automatically seat and close such vents. Thereafter, stop cocks at vents 16 and at inlet port 24 may be manually turned, hermetically closing and sealing the water filed matrix.

The filled matrix 21 advantageously holds the trap 8 in place during windy weather.

While the principles of the invention have been made clear in the above illustrative embodiment, those skilled in the art may make modifications to the provisions of structures and structural arrangements including the invention's assembly without departing from those principles. Those skilled in the art may also modify the invention's method steps including changes to their identity, character, and sequence of performance without departing from those principles. Accordingly, it is intended that the description and drawings be interpreted as illustrative and not in the limiting sense, and that the invention be given a scope at least commensurate with the appended claims.

The invention hereby claimed is:

1. A method for stabilizing a tarp covering a grain mound, the method comprising steps of:
    (a) assembling a matrix of flexible tubes over the tarp; and
    (b) filling the matrix of flexible tubes with water so that the weight of the water presses the matrix of flexible tubes against the tarp; wherein the step of assembling the matrix of flexible tubes is performed by a worker while the worker is on the grain mound.

2. The method for stabilizing the grain mound covering tarp of claim 1 wherein the assembling a matrix of flexible tubes over the tarp steps include providing a multiplicity of collapsible flexible tubes.

3. Method for stabilizing the grain mound covering tarp of claim 2 wherein the assembling a matrix of flexible tubes over the tarp steps include a step of forming a quadrilateral grid of tubes.

4. Method for stabilizing the grain mound covering tarp of claim 3 wherein the forming a quadrilateral grid of tubes steps includes steps of providing a plurality of T joints and providing a plurality + joints.

5. Method for stabilizing the grain mound covering tarp of claim 4 wherein the providing a multiplicity of collapsible flexible tubes steps include steps of providing pairs of cam connector halves, each pair of cam connector halves being attached to the ends of one of the provided collapsible tubes.

6. Method for stabilizing the grain mound covering tarp of claim 5 wherein each provided T joint includes an attached triple of cam connector halves.

7. Method for stabilizing the grain mound covering tarp of claim 6 wherein each provided + joint includes an attached quadruple of cam connector halves.

8. Method for stabilizing the grain mound covering tarp of claim 7 wherein the steps of forming a quadrilateral grid of tubes includes forming a trunk line, wherein each provided + joint is incorporated in the trunk line.

9. Method for stabilizing the grain mound covering tarp of claim 8 further comprising a step of providing at least a first air relief port connected operatively to a matrix component selected from the group of connectors consisting of the + joints and the T joints.

10. Method for stabilizing the grain mound covering tarp of claim 9 further comprising a step of providing a water supply line connected operatively to the matrix of flexible tubes, wherein the filling the matrix of flexible tubes with water step utilizes said water supply line.

* * * * *